United States Patent [19]

Kohn et al.

[11] Patent Number: 4,568,585
[45] Date of Patent: Feb. 4, 1986

[54] CONTOURABLE CORE FOR STRUCTURAL LAMINATES

[75] Inventors: Jacques Kohn, New York, N.Y.; Joseph E. Pantalone, Bergenfield; Kurt Feichtinger, Ringwood, both of N.J.

[73] Assignee: Baltek Corporation, Northvale, N.J.

[21] Appl. No.: 704,172

[22] Filed: Feb. 22, 1985

[51] Int. Cl.⁴ .......................... B32B 3/14; B32B 5/04
[52] U.S. Cl. ......................................... 428/48; 428/52; 428/53; 428/247; 428/230; 156/258; 156/268
[58] Field of Search ..................... 428/44, 47, 48, 52, 428/53, 223, 230, 231, 247; 156/258, 268

[56] References Cited

U.S. PATENT DOCUMENTS 3,376,185  4/1968  Shook et al. ............................ 428/47
3,616,112  10/1971  Desai .................................... 428/48

Primary Examiner—Alexander S. Thomas
Attorney, Agent, or Firm—Michael Ebert

[57] ABSTRACT

A light-weight, high-strength contourable core for inclusion in a contoured structural laminate in which the core is sandwiched between facing skins. The core is constituted by a planar array of block-like modules preferably made of end-grain balsa wood held together in edge-to-edge relation by a scrim formed by elastomeric filaments which extend through the body of the modules in an intermediate plane parallel to the opposing faces of the core. When the planar core is pressed against a wet-coated contoured skin surface for lamination thereto, the filaments bridging adjacent modules elongate to an extent permitting these modules to separate and conform to this surface. The filaments have an elastic recovery force low enough to prevent the modules from overcoming the surface tension created by the wet-coated surface and pulling away therefrom. However, the holding power of the filaments is sufficient to preclude disassembly of the core modules during normal core handling procedures.

11 Claims, 9 Drawing Figures

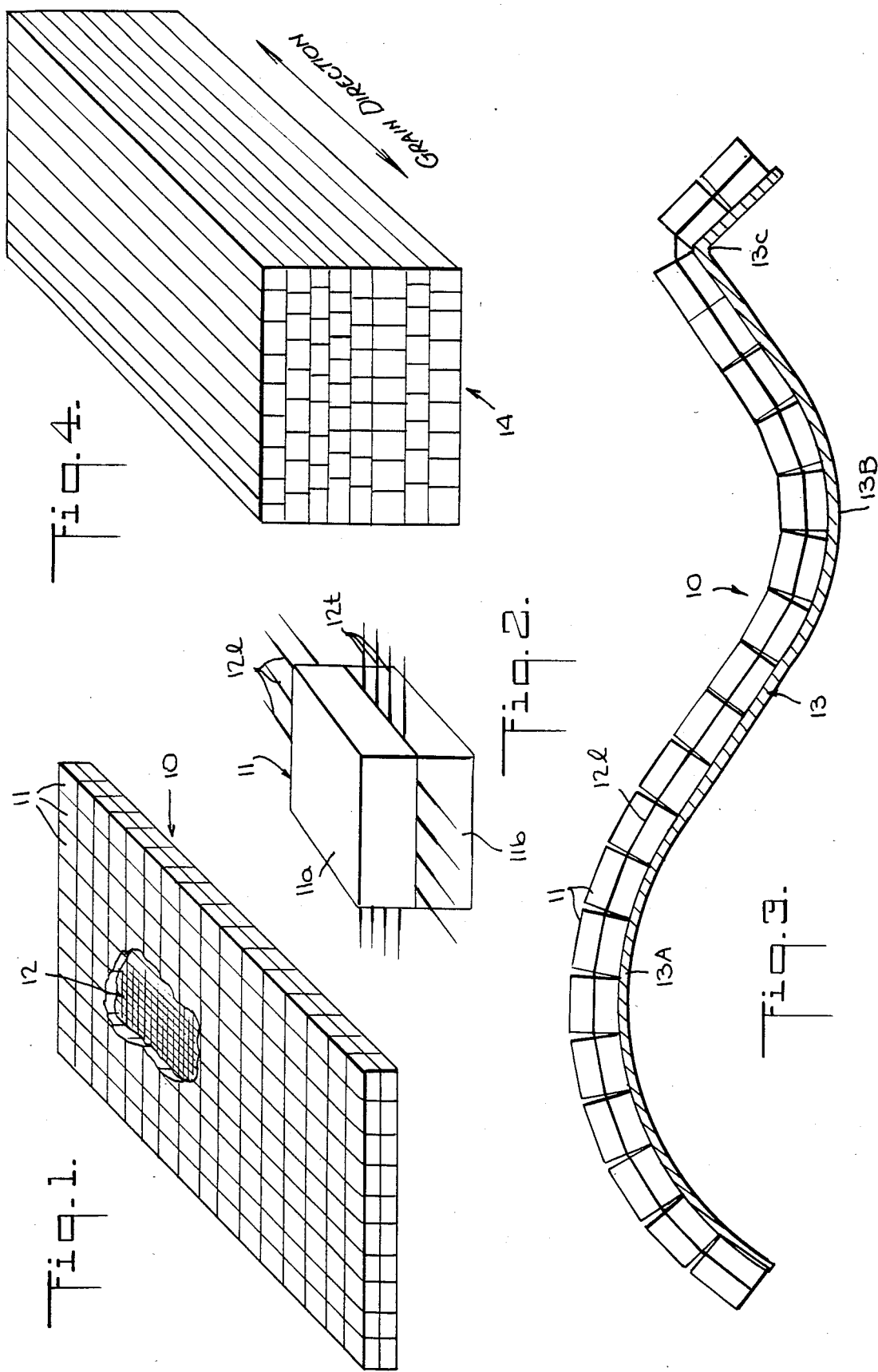

CONTOURABLE CORE FOR STRUCTURAL LAMINATES

BACKGROUND OF INVENTION

1. Field of Invention:

This invention relates generally to light-weight high strength contourable cores for inclusion in a laminated contoured structure in which the core is sandwiched between facing skins, and more particularly to a core formed of a planar array of block-like modules held together in edge-to-edge relation by a scrim formed of elastomeric filaments which extend through the body of the modules in an intermediate plane parallel to the opposing faces of the core.

2. Prior Art:

The present invention, though applicable to various species of wood, is of particular value in connection with balsa wood derived from a tropical American tree (Ochroma pyramidale). Balsa wood has outstanding properties unique in the lumber field; for on the average, it weighs less than 9 pounds per cubic foot, this being 40% less than the lightest North American species. Its cell structure affords a combination of high rigidity and compressive and tensile strength superior to any composite or synthetic material of equal or higher density. And while the invention will be described herein only in regard to balsa wood, it is to be understood that it is also applicable to many other wood species, as well as to rigid foam plastic and other materials having acceptable structural properties in the context of laminated structures.

The market for balsa wood is considerable, for structural sandwich laminates having an exceptionally high strength-to-weight ratio can be created by bonding thin facings or skins to balsa wood panels which function as a core. Thus, the Kohn et al. U.S. Pat. No. 3,325,037 and the Lippay U.S. Pat. No. 3,298,892 disclose structural sandwich laminates whose core is formed of end-grain balsa wood. End-grain balsa-cored sandwich laminates are widely used in transportation and handling equipment, such as for floors for railroad cars, shipping containers, cargo pallets, bulkheads, doors, reefer bodies, as well as in a wide variety of cryogenic applications which exploit the excellent thermal insulation properties of balsa. These structural laminates are also employed in aircraft applications, in housing and in boating.

Where the structure to be reinforced is constituted by planar surfaces, the balsa core may simply be a solid board or panel laminated to the facings. But in the case of boat hulls and other structures having single and double curvatures or other complex contours, it is ordinarily not possible to conform solid balsa to the contoured surface without bending the balsa panel. Such bending involves difficult, time-consuming and expensive procedures.

Contourable balsa blankets are now commercially available that are composed of small individual balsa blocks attached to a common carrier such as a fabric scrim, whereby the blanket may readily be conformed to a curved surface for lamination thereto. A contourable balsa wood core of this type is disclosed in the Shook U.S. Pat. No. 3,540,967 and is marketed under the trademark "Contour Kore" by the Baltek Corporation of Northvale, N.J.

Such contourable balsa blankets are useful in the construction of reinforced plastic boats and larger vessels, for they lend themselves to lamination between layers of resin-reinforced fiberglass or other plastic material, thereby bringing about a distribution of weight favorable to high stability and buoyancy, as well as imparting stiffness to the structure.

The above-identified Shook patent discloses a contourable blanket in which the end-grain balsa wood blocks are attached by pressure-releasable adhesive lines to a fabric scrim made of a non-woven, open-mesh material of fiberglass or other non-stretchable yarns of high tensile strength. Because of the open mesh, the surfaces of the blocks are almost fully exposed to facilitate lamination. On the other hand, the stability of the scrim maintains the balsa blocks or modules at their assigned positions in the planar array thereof and prevents overlapping thereof during handling. Because fiberglass is wettable, it may be effectively bonded by standard resins and other adhesive agents both to the blocks and to the laminating plies.

When the contourable core is laid down on a contoured surface for lamination thereto with the scrim facing out, and the blocks are then pressed into conformity with the surface by a roller or other means, each block will assume an orientation determined by the surface engaged thereby. Where the orientation of a given block varies from that of the adjacent block as will occur in complex curvatures, the block will then partially detach itself from the scrim to the extent necessary to assume the desired orientation. Thus for a given contoured surface, selected blocks in the core are detached partially from the scrim, such detachment being facilitated by the adhesive line connections which permit release when pressure is applied to the block.

It has been found in working with a contourable blanket having a scrim secured to one face thereof, that bonding of the scrim-free face to a facing skin can be rendered highly effective, whereas the bonding of the scrimmed face to a facing skin is rendered somewhat less effective in that the scrim lies within and degrades the bonding interface. Since the strength of the resultant laminated structure depends in good part on the strength of the bonds between the core and the facing skins, the relative weakness of the scrim-side bonding line represents a negative factor in this regard.

Another factor which militates against the effectiveness of an exposed scrim blanket is that the scrim, being attached to the balsa wood blocks on one face thereof, creates an unbalanced structure; for if the wood swells because of a change in its moisture content, it is restrained only on the scrim face and not on the naked face. As a consequence, such blankets are subject to warping, which makes it difficult in some instances to hold it down on a resin-coated contoured surface when this coating is in the wet, uncured state.

Yet another drawback of an exposed scrim blanket of the prior art type is that the flexible scrim is non-stretchable; hence the blanket is conformable to a contoured surface whose curvature extends in one direction only. But if the contoured surface has a curvature running in the longitudinal direction as well as a curvature running in the transverse direction or is at some point concave and at another convex, the scrim blanket can be bent to conformity in only one of these directions, for the scrim then resists conformity in the other direction.

SUMMARY OF INVENTION

In view of the foregoing, the main object of this invention is to provide an improved contourable core for inclusion in a contoured structural laminate in which the core is constituted by a planar array of individual modules held together in edge-to-edge relation by a scrim formed of elastomeric filaments extending through the body of the modules in an intermediate plane parallel to the opposing faces of the core.

A salient advantage gained by contourable core in accordance with the invention in which the scrim lies in a plane intermediate the opposing faces of a core composed of balsa wood blocks is that both faces of the core are naked and may be strongly bonded to facing skins to provide high-strength, light-weight laminates. Moreover, because both faces of the balsa-wood core are scrim-free they may be sanded or otherwise finished.

More particularly, an object of the invention is to provide a contourable core having a mid-plane scrim which is bendable in any direction so that the core can be draped over and conformed to contoured surfaces having compound curves or both concave or convex areas.

Also of significant advantage is that the scrim holding together the modules lies in an intermediate plane between the opposing faces; hence, both faces are unrestrained and not subject to warpage as a result of small changes in individual module size arising from an increase in moisture content.

Also an object of the invention is to provide a technique for fabricating a contourable core of the above type which makes it possible to mass-produce such cores at relatively low cost.

Briefly stated, these objects are accomplished in a light-weight, high-strength contourable core for inclusion in a contoured structural laminate in which the core is sandwiched between facing skins. The core is constituted by a planar array of block-like modules preferably made of end-grain balsa wood held together in edge-to-edge relation by scrim formed by elastomeric filaments which extend through the body of the modules in an intermediate plane parallel to the opposing faces of the core. When the planar core is pressed against a wet-coated contoured skin surface for lamination thereto, the filaments bridging adjacent modules elongate to an extent permitting these modules to separate and conform to this surface. The filaments have an elastic recovery force low enough to prevent the modules from overcoming the surface tension created by the wet-coated surface and pulling away therefrom. However, the holding power of the filaments is sufficient to preclude disassembly of the core modules during normal core handling procedures.

OUTLINE OF DRAWINGS

For a better understanding of the invention as well as other objects and further features thereof, reference is made to the following detailed description to be read in conjunction with the accompanying drawings wherein:

FIG. 1 is a perspective view of a contourable core in accordance with the invention;

FIG. 2 illustrates one of the core modules and the scrim filaments extending from the body of the module;

FIG. 3 shows the core when it is conformed to a contoured surface;

FIG. 4 shows the basic block from which the core is derived;

DETAILED DESCRIPTION OF INVENTION

The Core Structure

Figure 5:
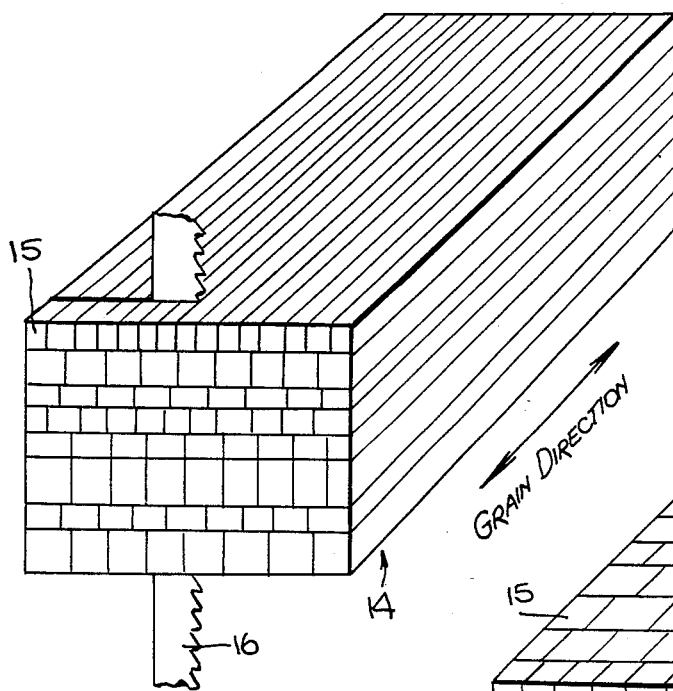
FIG. 5 illustrates the first processing step in deriving the core from the basic block.

Referring now to FIG. 1, there is shown a contourable core in accordance with the invention, generally designated by numeral 10, for inclusion in a contoured structural laminate in which the core is sandwiched between facing skins and is bonded thereto.

Core 10 is constituted by a planar array of individual block-like modules 11, preferably made of end-grain balsa wood whose fibers are generally normal to the opposing faces of the core. The modules are held together in edge-to-edge relation by an open-mesh scrim 12 formed by elastomeric filaments which extend through the body of the modules in an intermediate plane parallel to the opposing faces of the core. Scrim 12 is preferably formed of non-woven monofilaments of spandex fiber in which the fiber-forming substance is a long chain of synthetic polymer having at least 85% of a segmented polyurethane.

One form of spandex which is commercially available in various deniers is "Lycra", the trademark for this fiber held by E. I. DuPont de Nemours & Co. The invention is, however, not limited to Lycra, for the required scrim may be made of any elastomeric filament whose properties satisfy the core requirements.

FIG. 2 illustrates one of modules 11 through whose body the filaments of scrim 12 extend in a mid-plane parallel to the opposing faces of the body. Scrim 12 in this instance is non-woven and is composed of parallel filaments $12_l$ which extend through the body of the modules in the longitudinal direction of the core 10 and parallel filaments $12_t$ which run at right angles to filaments $12_l$ and extend through the body of the module in the transverse direction of the core.

When the modules of the core are formed of foam plastic or other moldable material, the filaments of the scrim are then embedded in the body of the module. But when the core modules are of balsa or other wood material, each module, as shown in FIG. 2, is composed of interlaminated complementary half-pieces 11a and 11b between which the scrim filaments are clamped.

Since the block-like module 11 illustrated in FIG. 2 is part of a planar array in which the modules are held together by the scrim 12 common to all modules, the longitudinal filaments $12_l$ which project from the front edge of the module pass into the body of the module adjacent thereto, while the filaments $12_l$ which project from the rear edge pass into the module adjacent thereto. The transverse filament $12_t$ projecting from the right and left edges of the module pass into the modules adjacent thereto.

Thus the longitudinal and transverse filaments of the scrim bridge the modules forming the core array to normally hold the modules together in edge-to-edge relation. The denier of the elastomeric filaments and their elastomeric properties are such as to tie the modules together without substantial separation therebetween in ordinary core handling procedures. However, when the planar core is placed over a contoured surface and is subjected to pressure, as by means of a roller, to conform the modules of the array to this surface, the elastomeric filaments then stretch to permit the modules to separate from each other to the degree necessary to effect such conformance.

The action is illustrated in FIG. 3 which shows a contoured surface having a layer 13 thereon formed by fiberglass which is wet-coated for lamination to the core to form a resin-impregnated skin of high strength when the wet resinous coating is cured. The contour of layer 13 which is shown only by way of example is such as to include a concave section 13A merging into a convex section 13B that terminates in a sharp bend 13C.

Thus in order for modules 11 of the core to conform to concave section 13A, the longitudinal filaments $12_l$ between adjacent modules must stretch to open a space between adjacent modules which progressively widens as one goes from the inner face to the outer face, thereby causing the modules to follow the curve. And in order for the modules to conform to concave section 13B, the resultant stretch of the filaments opens a space between adjacent modules which progressively widens as one goes from the outer face to the inner face.

Because the modules are pressed against a wet coating, a surface tension is developed which resists the tendency of the stretched filaments to pull the modules back to their normal position in the planar array. The elastomeric properties of the filaments are such as to provide a relatively lower recovery force which is insufficient to overcome the surface tension; hence, when the conforming pressure imposed on the modules is released, the modules remain in the conformed positions dictated by the contour of the surface. However, the filaments are sufficiently strong so that while some elongation may be experienced in rough handling, they do not break, and after the handling forces are removed, the modules are returned by the bridging filaments to their original positions in the array. It must be borne in mind that balsa wood is exceptionally light, hence the strength required of the filaments so that there is proper spring-back of the modules is not high.

For a very sharp bend, as in section 13C of the contoured surface, the resultant tension imposed on the stretched filaments to permit the modules to conform to the bend is quite high. However, by making the filaments with a smooth surface and a round cross section, the filaments which are held by a bonding agent between the half pieces of the balsa block, when subjected to a heavy tension will disengage themselves from the bonding agent and partially pull through to reduce the tension and avoid rupture. It must be borne in mind, however, that if by reason of a very sharp bend, the stresses exerted on the filaments are so high as to result in their rupture, this is not disadvantageous, for once the modules lie in conformity with the contoured surface, there is no need to tie them together.

Because the exposed faces of the core are scrim-free, these faces may be sanded and otherwise finished to prescribed dimensions. Such sanding not only smooths the face but also serves to partially close the pores of the end-grain balsa and thereby limit the degree to which the wet-coated resin will impregnate the pores in the course of lamination to facing skins. Alternatively, a sealant may be applied to the exposed faces to close the pores without interfering with the action of the laminating resins or epoxies.

Techniques for Making the Core

A preferred technique for making a contourable core of the type illustrated in FIG. 1 in accordance with the invention will now be described.

The feedstock is provided by a large basic block 14, as shown in FIG. 4, formed of balsa wood whose grain direction, as indicated by the arrow, extends in the horizontal plane so that the fibers of the wood are generally normall to the long sides of the block.

Block 14 is formed by interfitted pieces or sectors of wood which are laminated together to form an integrated block in the manner disclosed, for example, in the patents to Jean Kohn, 4,122,878 and 4,301,202. The present invention is in no way concerned with how the basic wood block is created, and use may be made of a basic wood block created by the methods disclosed in the Sorenson patent No. 781,376, the Anderson patent No. 2,878,844, and the Hasenwinkle patents No. 3,903,943, 3,961,644 and 3,989,078.

We shall now set out the successive steps by which the basic block 14 is processed to produce the contourable core 10 shown in FIG. 1.

Step 1:

The first step, as shown in FIG. 5, is to section the basic block 14 into a plurality of like end-grain panels 15 by means of a bandsaw 16 which operates in a plane perpendicular to the grain direction. The thickness of each panel is equal to that of a module half piece 11a or 11b as shown in FIG. 2.

Step 2:

The scrim 12 employed in the core may be made in a conventional manner using the specified elastomeric filaments to produce a non-woven open mesh scrim. Or a scrim formed of elastomeric filaments exhibiting the required low elastic recovery force and high strength may be formed on a tenter frame on which a continuous filament is wound between the hooks at the edges to form non-woven parallel warp and woof fibers.

The angle of the two major filament directions on the tenter frame is governed by the desired final product performance, and the choice of filament denier and spacing of centers is similarly derived. The initial tension of the filaments hooked on the frame will also be governed by the requirement of the final product. The invention is not limited to a non-woven scrim, and in practice one may use an open mesh fabric woven of elastomeric filaments having the specified properties.

Step 3:

An appropriate adhesive material is applied to one end-grain surface of one, and possibly both, panels 15 to be assembled. In practice, a coating rool may be employed, although this step can be carried out by spraying, dipping, or the use of adhesive films.

The adhesive selected for this purpose must provide adequate bonding properties for an end-grain, surface-to-surface butt joint and preferably be compatible with or have no adverse effect on the polyester and epoxy matrices used in sandwich structures. Furthermore, the bond strength of the adhesive to the filamentous scrim material should be poor to allow for the previously mentioned "pull-through" phenomenon.

Figure 6:
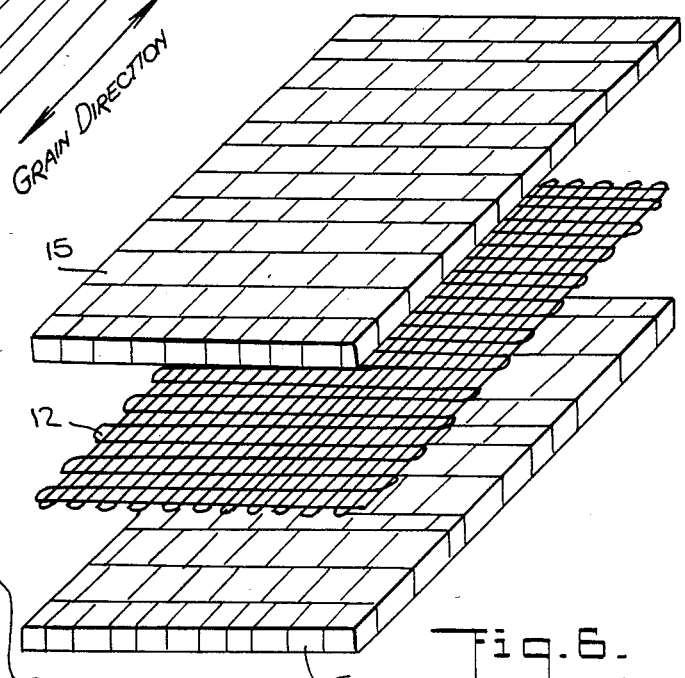
FIG. 6 shows how two solid core half-sections are brought together to sandwich a scrim therebetween to form a solid core.
Figure 7:
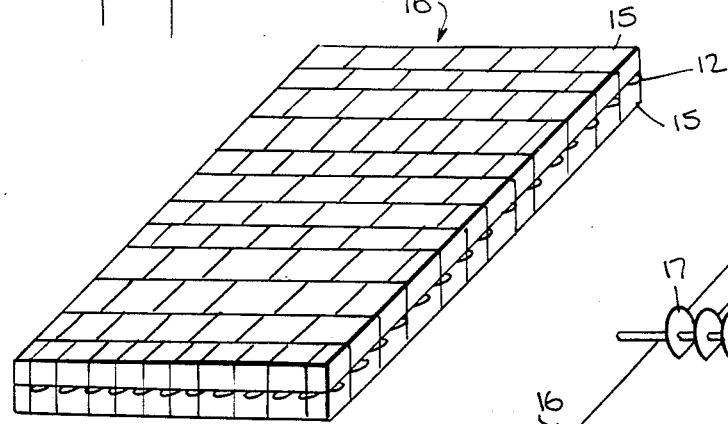
FIG. 7 shows the resultant solid core.

Step 4:

Two appropriately prepared panels 15 are then brought together in a sandwich manner with scrim 12 situated in the adhesive plane, as shown in FIG. 6, to create the solid core 16 shown in FIG. 7. Current practices for joining, such as press operations or nip rolls, and for curing of the adhesive, such as ambient heat, RF, ultra-violet and the like, may be employed to effect an adequate bond. The resultant solid core 16 which is non-contourable, is for all practical purposes identical to a single, solid end-grain panel but with a scrim 12 located in the mid-plane between the opposed outer faces.

Figure 8:
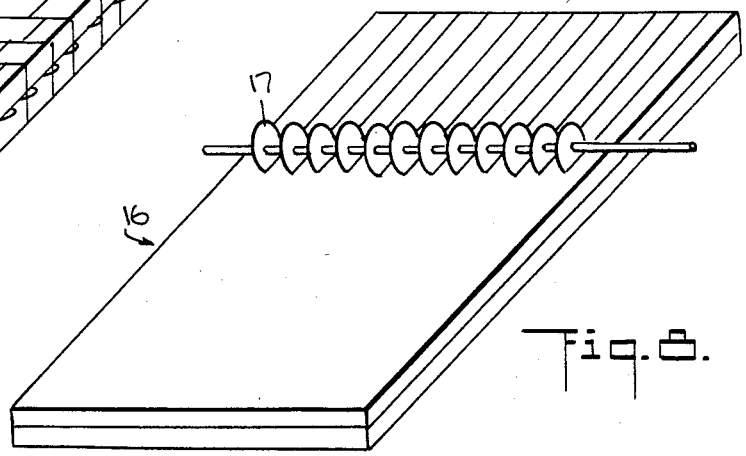
FIG. 8 shows how the solid core is slit to form the contourable core.

Step 5:

To dissect the solid core into an array of interconnected modules and thereby create its contourable core 10, a slitting operation is required. This involves rotary slitters 17, as illustrated in FIG. 8. In order to avoid damage to the filaments of the scrim, slitting must be carried out on each of the pair of panels 15 which form the core to a precise depth which will preclude invasion of the scrim filaments. Additionally, two slitting passes per panel in orthogonal directions are required to form individual modules of the appropriate dimensions. Hence, the relative position of solid core 16 with respect to the slitters 17 demands close control to ensure that the top and bottom slit planes coincide. The final product, as shown in FIG. 1, is a contourable core 10 with a scrim absent from the outer, exposed surfaces.

Figure 9:
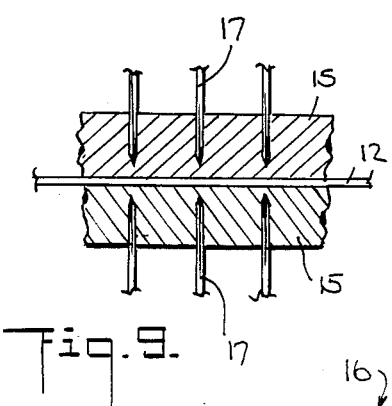
FIG. 9 shows the relationship of the slitting wheels to the core.

In order to avoid damage to the scrim, the slitters 17 as shown in FIG. 9, are adjusted relative to the depth of panels 15 to cut to a point just short of the scrim, leaving a very thin, easily-ruptured membrane which holds the modules together until a contouring force is applied.

While there has been shown and describe a preferred embodiment of CONTOURABLE CORE FOR STRUCTURAL LAMINATES in accordance with the invention, it will be appreciated that many changes and modifications may be made therein without, however, departing from the essential spirit thereof.

Thus, instead of embedding a scrim in the mid plane of a core formed by an array of end grain balsa wood modules as disclosed hereinabove, one may cut shallow slits along parallel lines into one face of the core and deposit filaments therein to hold the modules together until such time as they are forced into conformity with a contoured surface.

To this end, use may be made of a row of slitting knives or wheels which run over the balsa wood face in the longitudinal direction to slightly penetrate this surface to form a shallow slit therein, a thread of filament being deposited into each slit, preferably in the immediate wake of the slitting wheel or knife. This operation is repeated in the transverse direction so that embedded superficially in one face of the core are warp and woof filaments forming a non-woven scrim. These filaments could be of elastomeric material or even a yieldable cotton-polyester thread.

Instead of embedding filaments or threads in a scrim formation in the modules which form the core, one may use a sewing technique to hold the modules together, use being made of a zig-zag stitch across each module joint. Or one could apply diagonal stitches at the junctions of the core modules which would locate the module-to-module interconnection at about the mid plane of the core. Alternatively, one could use a curved needle stitch which would only pass through one face of the core modules.

Rather than use filaments or threads to hold the core modules together, stretchable joints therebetween may be formed by adhesive lines. To this end, one may use a row of printing wheels, each of whose rims has a raised zig-zag or sprocket-like formation. When the wheels run over the module junctions on the core face, they form shallow impressions therein, in each of which is imprinted a hot melt or other adhesive. When the adhesive impressions cure, they form adhesive lines bridging the junctions between the modules. This adhesive printing procedure is carried out in both the longitudinal and transverse directions to form a network of adhesive lines acting effectively as a superficially embedded scrim. Another approach is to apply, by means of a roller, a narrow adhesive tape over the junction lines on the core face, the tape being of scrim-like material.

I claim:

1. A contourable core for inclusion in a contoured structural laminate in which the core is sandwiched between facing skins; said core comprising a planar array of block-like modules held together in edge-to-edge relation by an open mesh scrim formed by elastomeric filaments which extend through the body of the modules in an intermediate plane parallel to the opposing faces of the core whereby when the planar core is pressed against a contoured skin surface for lamination thereto, the filaments bridging the modules elongate to an extent permitting the modules to separate and conform to this surface.

2. A contourable core as set forth in claim 1, wherein said lamination is effected to a wet-coated contoured surface, and wherein said filaments have an elastic recovery force which is sufficiently low to prevent the modules from overcoming the surface tension created by the wet coating and pulling away from the surface.

3. A core as set forth in claim 1, wherein said filaments are formed of spandex.

4. A core as set forth in claim 1, wherein said plane is midway between the faces of the core whereby the core is bendable in any direction.

5. A core as set forth in claim 1, wherein each module is composed of two interlaminated half-pieces of end-grain balsa, the scrim being clamped between the half pieces.

6. A core as set forth in claim 5, wherein said scrim is formed of longitudinally and transversely extending filaments forming a non-woven fabric.

7. A core as set forth in claim 1, wherein said modules are formed of synthetic plastic material.

8. A core as set forth in claim 1, wherein said modules are formed of end-grain balsa wood whose opposing faces are sanded to partially close the pores of the wood.

9. A core as set forth in claim 1, wherein said filaments have a holding power sufficient to prevent disassembly of the modules in normal handling of the core.

10. A method for producing a contourable core of the type set forth in claim 1 comprising the steps of:
A. cutting a large block of wood into like individual panels;
B. sandwiching an open mesh scrim formed of elastomeric filaments between a pair of the panels and laminating the scrim thereto; and
C. slitting the panels in the sandwich into a planar array of block-like modules which are held together by the filaments of the scrim.

11. A method as set forth in claim 10, wherein said block is composed of balsa wood, and said cutting is carried out in a direction producing end-grain panels.

* * * * *